(12) United States Patent
Timmermans

(10) Patent No.: US 9,294,456 B1
(45) Date of Patent: Mar. 22, 2016

(54) GAINING ACCESS TO AN ACCOUNT THROUGH AUTHENTICATION

(71) Applicant: Amazon Technologies, Inc., Reno, NV (US)

(72) Inventor: Ivo Roald Timmermans, Rotterdam (NL)

(73) Assignee: Amazon Technologies, Inc., Reno, NV (US)

( * ) Notice: Subject to any disclaimer, the term of this patent is extended or adjusted under 35 U.S.C. 154(b) by 27 days.

(21) Appl. No.: 13/950,748

(22) Filed: Jul. 25, 2013

(51) Int. Cl.
*G06F 7/04* (2006.01)
*H04L 29/06* (2006.01)

(52) U.S. Cl.
CPC .............. *H04L 63/08* (2013.01); *H04L 63/083* (2013.01)

(58) Field of Classification Search
None
See application file for complete search history.

(56) References Cited

U.S. PATENT DOCUMENTS

| | | | |
|---|---|---|---|
| 7,158,983 B2 * | 1/2007 | Willse et al. | |
| 8,380,503 B2 * | 2/2013 | Gross | 704/246 |
| 8,387,122 B2 * | 2/2013 | Toomim et al. | 726/5 |
| 2007/0122792 A1 * | 5/2007 | Galley | G09B 7/02 434/353 |
| 2007/0162761 A1 * | 7/2007 | Davis et al. | 713/182 |
| 2010/0122340 A1 | 5/2010 | Chow et al. | |

* cited by examiner

*Primary Examiner* — Brandon Hoffman
(74) *Attorney, Agent, or Firm* — Klarquist Sparkman, LLP

(57) ABSTRACT

A user locked out of an account can gain access by allowing the user to reset the current password. An account access service can determine questions to ask the user. The account access service can maintain a trust level score, which is increased or decreased with each response to a question. Once this trust level reaches a certain predetermined amount, the user can regain access to the service, the account is unlocked, and the user can enter a new password to use.

21 Claims, 12 Drawing Sheets

GAINING ACCESS TO AN ACCOUNT THROUGH AUTHENTICATION

BACKGROUND

Resetting passwords can consume considerable managerial or administrator time. Password resetting becomes necessary when a user mistakenly enters his/her password incorrectly a predetermined number of times in succession or if the user cannot remember the password and requests a reset be performed. Automated techniques for resetting passwords are becoming commonplace. Example automated techniques including sending an email to the user with a reset link, or providing a set of personal questions to which the user has previously provided answers. If an email account is the service that the user is locked out of, the reset link can be sent to a secondary email address.

In an enterprise environment, a customer can have multiple individual users, each with his/her own username and password. Generally, an administrator is in charge of the account and would have access to a secondary email address, rather than each individual user. Resetting a password in an enterprise environment can be more difficult than with personal accounts. For example, enterprise resets through an email account might not be possible, as it is a customer account (including email) to which the user cannot access in the first place. Secondary email accounts also may be difficult for resets in the enterprise context, as it is the customer (i.e., an administrator) that has a secondary email address, rather than each individual user.

Better techniques for resetting enterprise passwords need to be developed.

DETAILED DESCRIPTION

Figure 1:
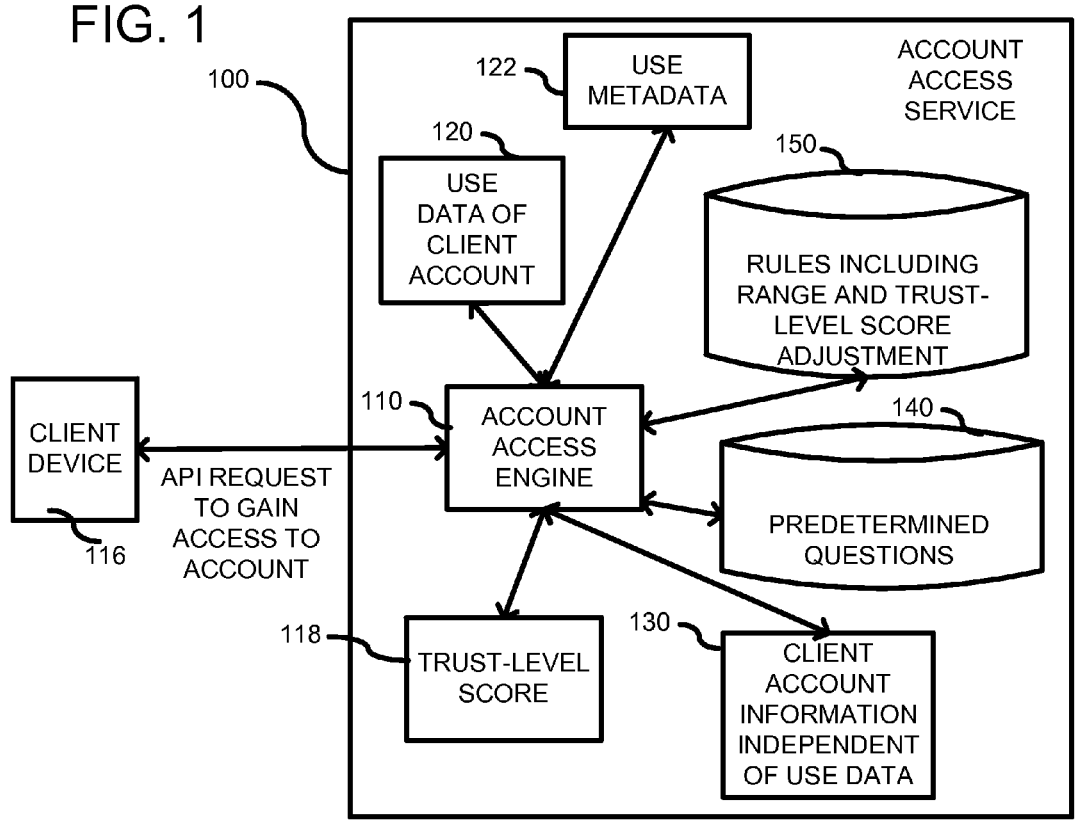
FIG. 1 is an example system diagram illustrating an account access engine that allows a user to gain access to an account through authentication.

FIG. 1 is an example system diagram illustrating of an account access service 100 including an account access engine 110 that allows a user to gain access to an account through authentication. A user of a client device 116 can become locked out of an account due to entering an incorrect account password a number of times in succession or the user can simply forget his/her password. After a user is locked out of his/her account, the user can click on a link in a user interface on the client device indicating that the user has requested to gain access to the account. Other techniques can be used for making such a request, such as accessing a web page with reset instructions. Gaining access to the account can be achieved through allowing or forcing the user to reset the current password. The account access service 100 can first attempt to contact the user via secondary e-mail address. Such an attempt can fail, such as when the secondary email address is no longer valid, or when the end user is part of an enterprise that signed up a plurality of users to use the account. In case of failure, the user can start a process of authentication as described herein.

During the course of this process, the account access service 100 and the user are engaged in a dialog in which the account access service asks a series of questions to authenticate that the user should have access to the account. The account access service can determine which questions to ask and the selection of questions, or the order in which questions are asked can be randomized. During the dialog, the account access service 100 maintains a trust-level score 118, which is increased or decreased with each response to a question. Once this trust level reaches a certain predetermined amount, the user can regain access to the service, the account is unlocked, and the user can enter a new password to use.

The questions can have an exact answer or an answer which is within an acceptable range of correct answers. For example, a date in the past can be asked for, and if the user answers within a 1% deviation from this date, the trust level can rise more than it would if the date is within a 10% distance of the actual date. The initial given trust and the threshold level can be adjustable based on the privacy of the service, which can be identified in a policy document under the control of an administrator.

The questions can be associated with a variety of data sources. For example, the account access engine 110 can have access to use data of the client account, as shown at 120. Use data includes any parameters associated with the account that change as the user is using the account. For example, an application in the account can have data associated with use. An example of such an application is an email application. The use data of such an email application can be a number of emails in an account, a date that somebody has written, names of people that the user sent emails to or received emails from. If the application is a word-processing application, then the use data can be a date that a document was accessed or a name of document that was recently accessed. Thus, use data can have a type associated therewith, the type being a date, a word, or a number response. Generally, date types have a wider latitude of responses that are acceptable than word types, especially the further the date is removed from the current date.

The account access engine 110 can use other data as well. For example, client account information 130 can include information that is independent of use data associated with applications. Examples of client account information include names, addresses, phone numbers, payment instruments (e.g., credit card numbers), etc.

Another data source can include use metadata 122. The use metadata can change as the user accesses the account, but is supplementary to such use. Examples of metadata can include when the account was accessed, IP addresses used to access the account, etc.

The request can be in the form of an API request. Once the account access engine 110 receives an API request to gain access to the account, it can access a database of predetermined questions 140. The predetermined questions can be retrieved randomly from the account access engine. Each question can be associated with rules and trust level score adjustments, which can be obtained from database 150. For example, a question can have a range of acceptable answers, wherein the range includes an upper bound and a lower bound. The question can also have an exact answer, which is typically at or near the center of the range. Thus, the account access engine 110 can retrieve a question, and determine from the database 150 how to obtain the exact answer to the question. For example, the account access engine can be told a source of the data, such as the client account information 130, or an application name to analyze. Other data sources can be related to use by a tenant in a multi-tenant client, as further described below. Once the exact answer is found, it can be used to set the upper and lower bounds. Another factor in calculating the upper and lower bounds can be a difficulty level stored in database 150. A difficulty level can associated with each question and can be used to dynamically calculate the range between the upper and lower bounds. The range information can also be hardcoded in a table wherein the retrieved data is used as a lookup field to retrieve the range. Generally, higher levels of difficulty are provided a wider range of acceptable answers. A user answer can then be used calculate a score based on how close within the range that the answer is to the exact answer. The larger the deviation, the lower the score. The smaller the deviation, the greater the score. The scores can be hardcoded in a lookup table, much like the difficulty level. In a simple example, the user answer is positioned between the exact answer and an upper bound of a range of answers. Thus, the answer is within the range of correct answers, which increases a trust level score. Some answers can also lower the score, such as answers outside of the range. In other circumstances, an exact answer can be sufficient to increase the trust level beyond the maximum needed. Thus, a sliding scale of trust is used to authenticate a user. If the trust level surpasses the maximum, then the user is provided with access to the account. On the other hand, if the user goes below the minimum trust level, then the user can be locked out of the account, which requires an administrator reset.

Figure 2:
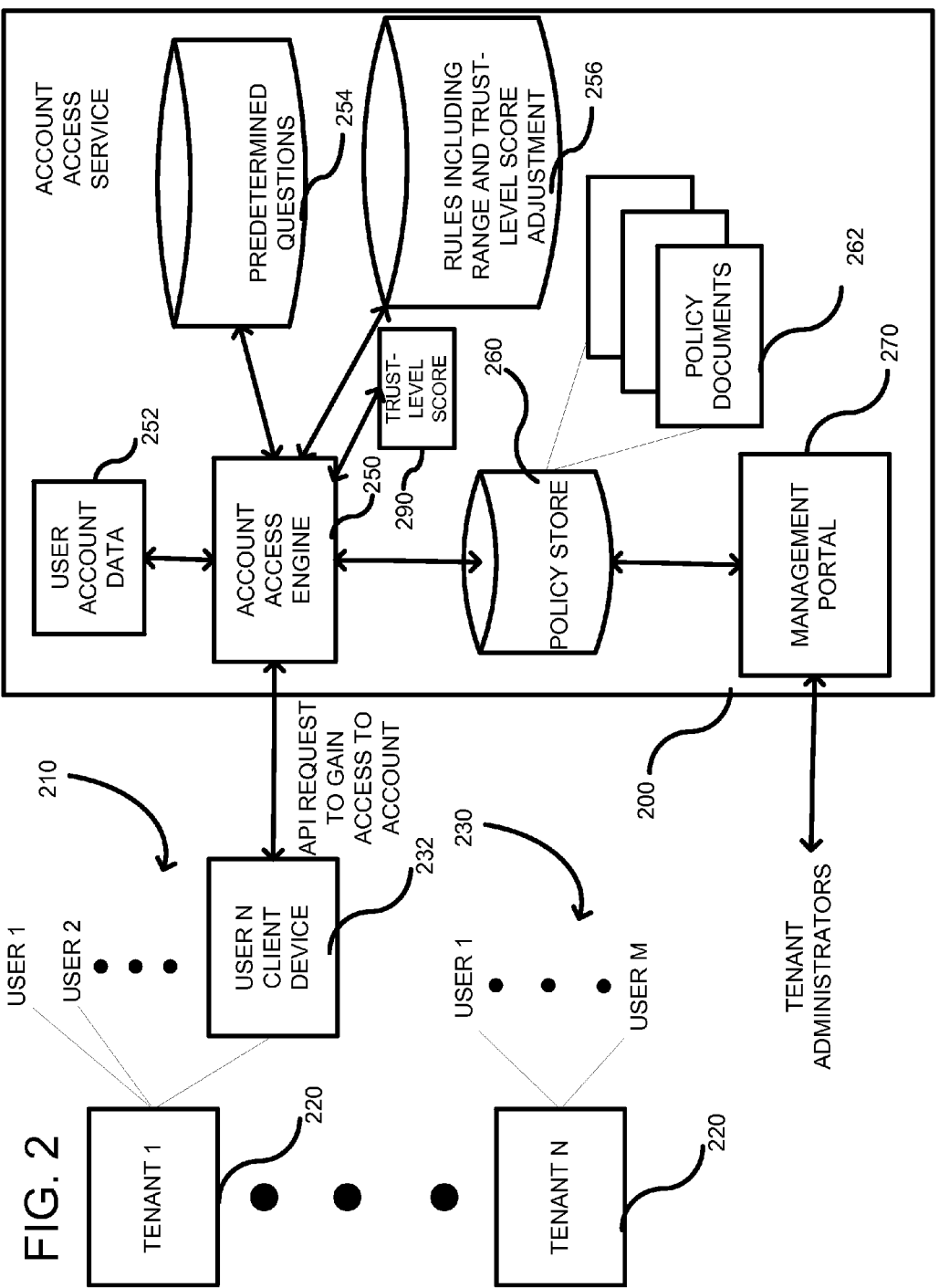
FIG. 2 is an example of an account access engine in a multi-tenant environment, wherein policy documents can control how authentication is implemented on a per-tenant basis.

FIG. 2 is an example of an account access service 200 in a multi-tenant environment 210. The account access service 200 is a service that can be provided by a virtual network provider, as is described further below in relation to FIGS. 4-6. The multi-tenant environment can include tenants 220 (1-N, where N is any integer number). Each tenant 220 can have multiple users 230 (1-M, where M is any integer number) associated therewith, and each user can have credentials, such as a username and password, for accessing data and applications associated with the tenant. Each tenant 220 can operate independently of the other tenants, so that a user associated with one tenant cannot gain access to data or applications of another tenant. A particular user of interest, shown using client device 232, desires to regain access to his/her account due to not knowing full account credentials. In particular, the user submits an API request to the account access service 200 in order to gain access to the account. An account access engine 250 can receive the API request and begin the necessary process for authenticating the user associated with client device 232. The account access engine 250 can access user account data 252, which can be any data associated with the account, including metrics that change based on use of the account (e.g., number of emails, number of instances running, metadata, etc.) or stored account information, which is independent of use of the account (e.g., customer identifiers, date the account was opened, etc.).

The account access engine 250 can also access predetermined questions 254, the answer to which can be determined by the account access engine 250 through accessing the user account data. Database 256 includes rules associated with processing answers to the questions. For example, a range for each question can be provided indicating an acceptable deviation from an exact answer and a trust-level score adjustment that can be calculated based on an amount of the deviation from the exact answer.

The account access engine 250 can also access a policy store 260. The policy store 260 includes a plurality of policy documents 262, which are modifiable by tenant administrators through a management portal 270. Each policy document 262 can include input parameters, which are rules associated with a tenant so that multiple users 230 are affected by a policy in the policy document. Examples of possible parameters in the policy document include an enable or disable switch, which controls the ability for the account access engine 250 to automatically authenticate a user, how many questions the user is allowed to answer in sequence without reaching a sufficient trust level score, a minimum number of questions that must be asked, a predetermined limit that the score must exceed in order to authenticate a user, etc. The policy document can further provide parameters of whether to use an IP address associated with the API request to authenticate the user. Generally, the same IP address in the API request to access an account as was previously used while accessing the account can increase the trust level. Thus, the policy document controls behavior of the account access engine 250 and its ability to allow access to the account through user authentication. Furthermore, the policy document parameters can be used in calculating the trust-level score by the account access engine 250. Another example of how the policy documents 262 can control how the account access engine calculates a score is by having a multiplier parameter that can be used to modify the trust-level score adjustment. For example, a trust-level score adjustment stored in database 256 can have a multiplier parameter associated therewith that is used in conjunction with the deviation from the exact score. An example formula used for the trust-level score adjustment could be dictated by the following formula: score adjustment=((constant/deviation)(multiplier)). The constant can be a simple integer number found in the database 256. The deviation is associated with how far the user answer is from the exact answer. Thus, a higher deviation reduces the overall score. The constant and deviation can be a single number found in a lookup table in database 256. The multiplier can control how fast the score adjustment increases or decreases. Ultimately, the account access engine 250 can generate a trust-level score, shown at 290, which is an indication of how close the user is on a sliding scale to be authenticated.

Figure 3:
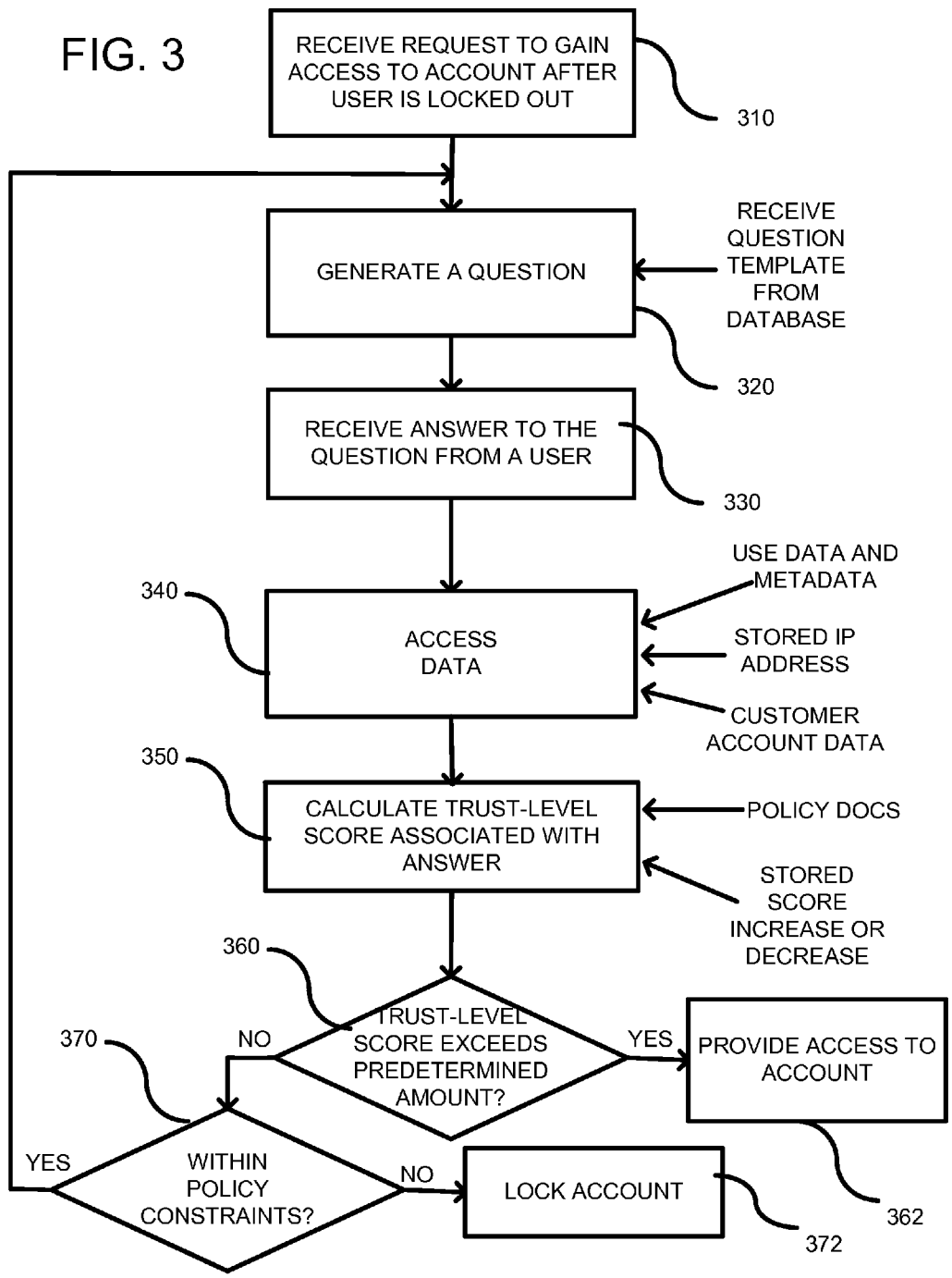
FIG. 3 is a detailed flowchart of a method for accessing an account through authentication according to one embodiment.

FIG. 3 is a flowchart of a method that can be used to allow access to a user account. In process block 310 a request is received to gain access to the user account after the user is locked out of the account. The request can include a request to reset a password and can be an API request provided by a client device. The API request can include an identifier associated with the user making the request, together with a customer identification number. Alternatively, the customer identification number can be derived from the API request. In process block 320, a question can be generated. As noted in FIGS. 1 and 2, the questions can be received from a database. The received questions can be in the form of question templates, which can have data inserted therein. Alternatively, the questions generated can be identical to the question templates, without the need for modification. Generation of the questions can include using a random order in which the questions are selected. Furthermore, a difficulty level of the question can be used in the question generation. For example, it may be determined after analyzing the difficulty level that the question should be bypassed if the difficulty is below a predetermined threshold. In one simple example, if there are no emails in the users inbox, the question of how many emails are in an inbox can be too simple. In such a case, that question can be bypassed and a next question can be randomly or sequentially selected.

In process block 330, an answer to the question can be received from the user. The answer can be of several types. For example, the answer can be a date type, a number type or a word type. Generally, word types require a more exacting answer. Date types, like a birthday, can require an exact answer, while other date types (what day did you access a document) can have a wider range of answers. Number types, like how many emails in an inbox, may also have a wide range of answers.

In process block 340, data can be accessed in order to determine if the answer provided is correct or is within an acceptable range. Different sources of data can be used, such as use data, one or more stored IP addresses, customer account data, etc. The use data is any data that changes dynamically as the user is using an application or using resources of a virtual network provider. Simple examples include how many of something, when a data related event occurred, or a source or destination of something. For example, when an email was received, from who it was received from, and when it was received are possible questions. Other questions can be associated with a multi-tenant environment, like how many instances are currently being executed, what region or country the instances are running in, etc. A stored IP address can be used when, during previous sessions, an IP address associated with the user has been stored. If the same IP address is now being used to request access to an account, then the trust level score can be increased. Thus, environmental parameters can exist that indicate the user is the same as from previous sessions. The customer account data can be data that does not change dynamically based on use of an account. The customer account data can relate to static data, which can change fixed number of times regardless of use activity, such as a customer identifier, customer birthday, credit card information, dates indicating when the user opened the account, when the user last accessed the account (changes once when the user accesses the account but is otherwise independent of use), how long the user accessed the account, time zone of the user, language, etc. It should also be noted that the data can be accessed prior to the generation of a question. Indeed, the data can be used in question generation, such as whether to bypass a question.

In process block 350, a trust-level score can be calculated associated with the answer. This process block can receive as input parameters information from policy documents or stored score increase or decrease information based on deviation. Calculation of the trust-level score can be to retrieve a stored current trust-level score and calculate a trust level increase or decrease based on the deviation of the user answer from the exact answer. Different algorithms can be used. However, parameters from the policy document can determine how fast or slow a trust-level maximum is received. In process block 360, if a trust level score exceeds a predetermined amount, then at process block 362, access can be provided to the account. In simple examples, this can include allowing the user to enter a new password or that the user is emailed, or otherwise given access to a new password. If the trust-level score does not exceed a predetermined amount, then at process block 370, a determination can be made whether continuing the authentication process complies with the current policy constraints obtained from a policy document. For example, the policy document may provide a maximum number of questions that can be asked. Or the trust-level score might be below a minimum threshold. If continuing with the authentication is not within the policy constraints, then at process block 372, the account can be locked. In such a case, a system administrator can get involved to unlock the account. If continuing the authentication is within the policy constraints, then a next question can be asked and the flow starts over with a next question. Ultimately, the user will either exceed the trust level score or violate a policy.

Figure 4:
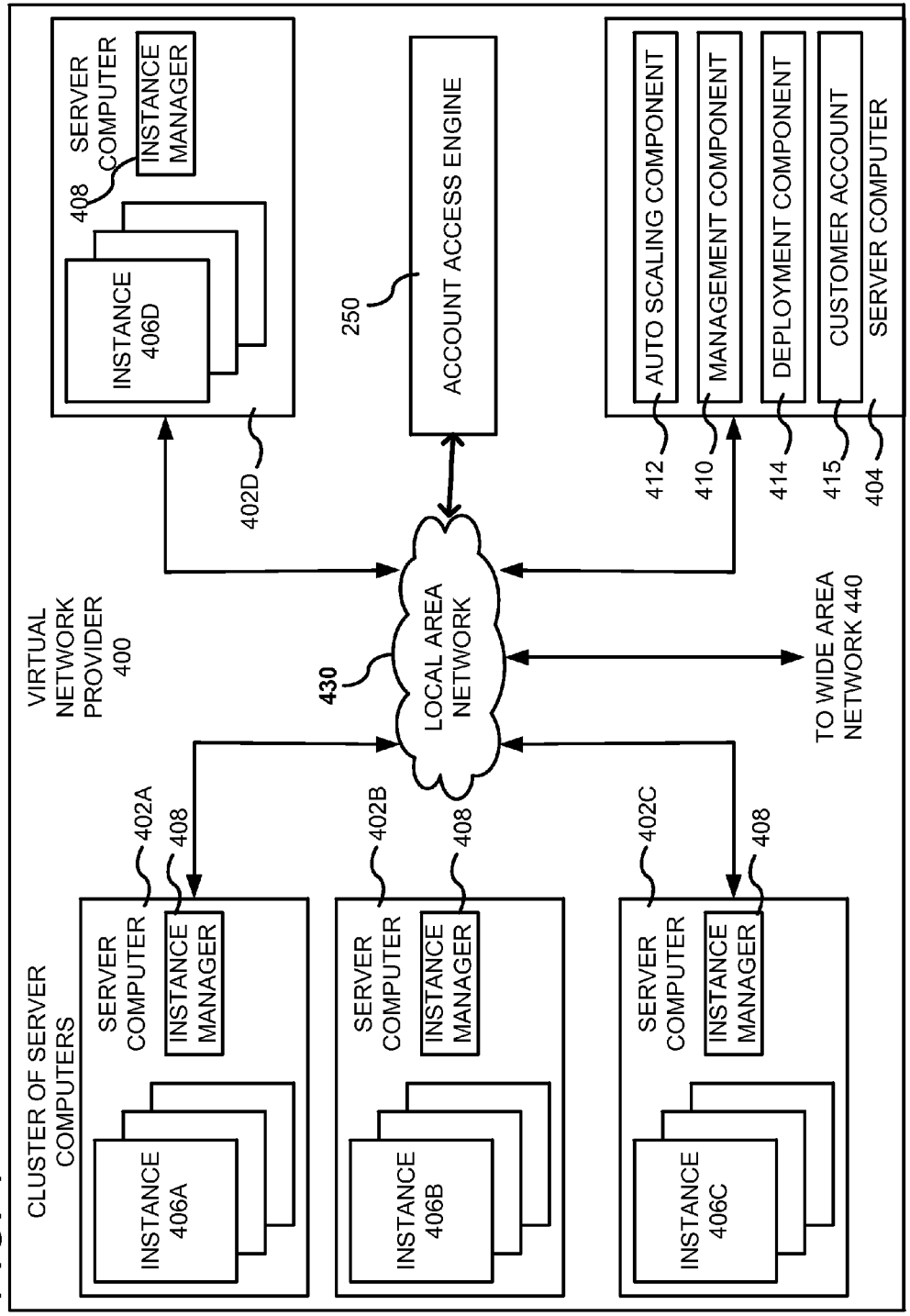
FIG. 4 is an example system diagram showing a plurality of virtual machine instances running in the multi-tenant environment, wherein the account access engine has access to use data of the tenants.

FIG. 4 is a computing system diagram of a network-based virtual network provider 400 that illustrates one environment in which embodiments described herein can be used. By way of background, the virtual network provider 400 (i.e., the cloud provider) is capable of delivery of computing and storage capacity as a service to a community of end recipients. In an example embodiment, the virtual network provider can be established for an organization by or on behalf of the organization. That is, the virtual network provider 400 may offer a "private cloud environment." In another embodiment, the virtual network provider 400 supports a multi-tenant environment, wherein a plurality of customers operate independently (i.e., a public cloud environment). Generally speaking, the virtual network provider 400 can provide the following models: Infrastructure as a Service ("IaaS"), Platform as a Service ("PaaS"), and/or Software as a Service ("SaaS"). Other models can be provided. For the IaaS model, the virtual network provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the virtual network provider platform without the cost of buying and managing the underlying hardware and software. The SaaS model allows installation and operation of application software in the virtual network provider. In some embodiments, end users access the virtual network provider 400 using networked client devices, such as desktop computers, laptops, tablets, smartphones, etc. running web browsers or other lightweight client applications. Those skilled in the art will recognize that the virtual network provider 400 can be described as a "cloud" environment.

The particular illustrated virtual network provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute an instance manager 408 capable of executing the instances. The instance manager 408 can be a hypervisor or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can also include the policy documents discussed above in relation to FIGS. 1-3. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 430 can be utilized to interconnect the server computers 402A-402D and the server computer 404, 450. The network 430 can be a local area network (LAN) and can be connected to a Wide Area Network (WAN) 440 so that end users can access the virtual network provider 400. It should be appreciated that the network topology illustrated in FIG. 4 has been simplified and that many more networks and networking devices can be utilized to interconnect the various computing systems disclosed herein.

The account access engine 250 can be connected through the local area network 430 to the one or more server computers 404, server computers 402, or other server computers (not shown.) The account access engine 250 can gather data from any of the available server computers in order to determine exact answers to questions which were provided to a user. The account access engine can also use any available services offered by the virtual network provider. As described further below, one such service monitors instances for tenants and stores information in a database accessible to the account access engine 250.

Figure 5:
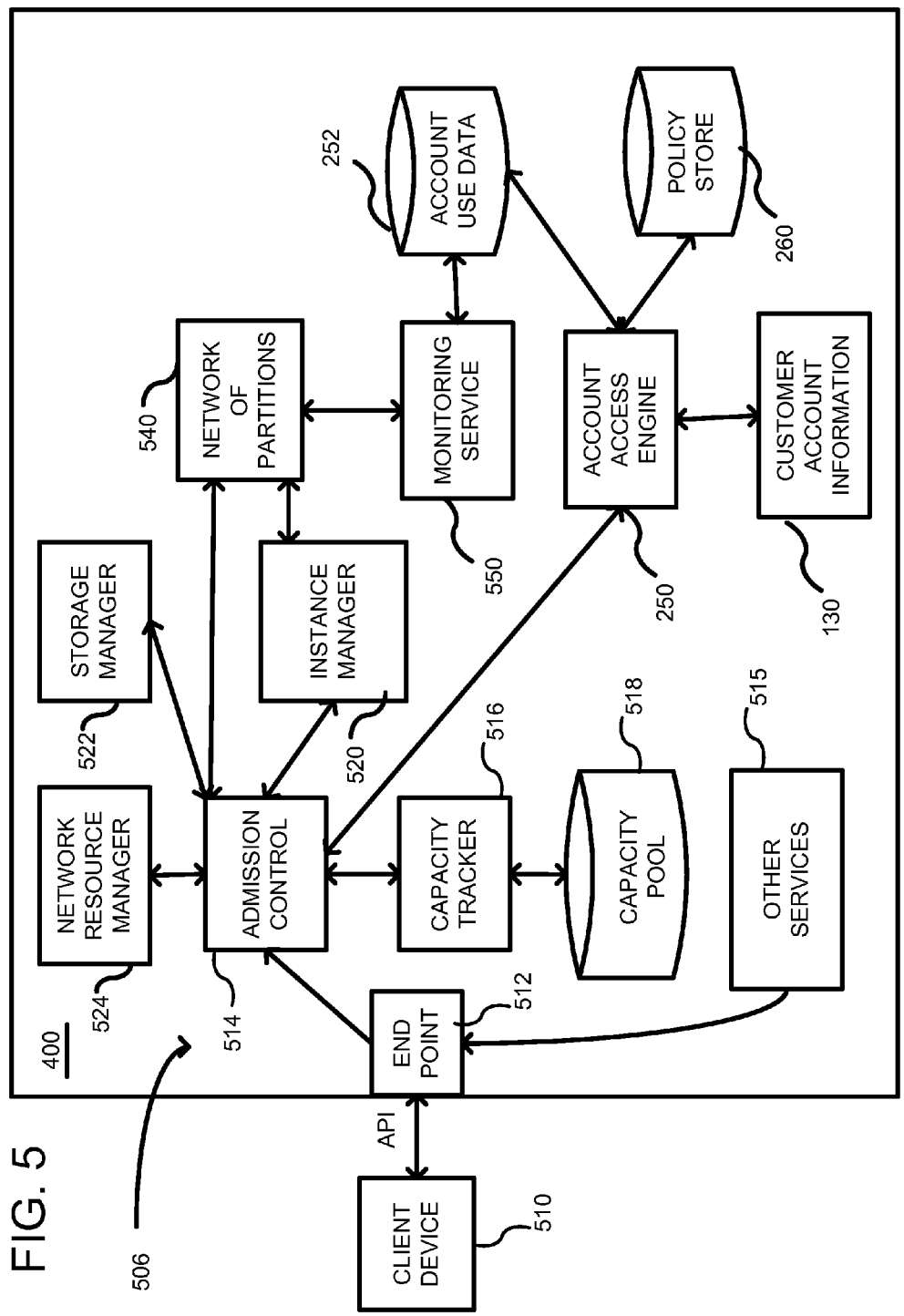
FIG. 5 shows further details of an example system including a plurality of management components associated with a control plane, wherein the account access engine can access account use data.

FIG. 5 illustrates in further detail management components 506 that can be used in the multi-tenant environment of the virtual provider network 400. In order to access and utilize instances (such as instances 406 of FIG. 4), a client device can be used. The client device 510 can be any of a variety of computing devices, mobile or otherwise including a cell phone, smartphone, handheld computer, Personal Digital Assistant (PDA), desktop computer, etc. The client device 510 can communicate with the virtual provider network 400 through an end point 512, which can be a DNS address designed to receive and process API requests. In particular, the end point 512 can be a web server configured to expose an API. Using the API requests, a client 510 can make requests to implement any of the functionality described herein. Other services 515, which can be internal to the virtual network provider 400, can likewise make API requests to the end point 512.

Other general management services that may or may not be included in the virtual network provider 400 include an admission control 514, e.g., one or more computers operating together as an admission control web service. The admission control 514 can authenticate, validate and unpack the API requests for service or storage of data within the virtual network provider 400. The capacity tracker 516 is responsible for determining how the servers need to be configured in order to meet the need for the different instance types by managing and configuring physical inventory in terms of forecasting, provisioning and real-time configuration and allocation of capacity. The capacity tracker 516 maintains a pool of available inventory in a capacity pool database 518. The capacity tracker 516 can also monitor capacity levels so as to know whether resources are readily available or limited. The instance manager 520 controls launching and termination of instances in the network. When an instruction is received (such as through an API request) to launch an instance, the instance manager pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6 and includes a physical layer upon which the instances are launched.

A monitoring service 550 provides monitoring for resources and the applications customers run on the virtual network provider 400. Tenants, developers and system administrators can use the monitoring service 550 to collect and track metrics, and gain insight to how applications are running. For example, the monitoring service 550 can allow a tenant to gain system-wide visibility into resource utilization, application performance, and operational health. The monitoring service 550 can also monitor instances custom metrics generated by a customer's applications and services. The monitoring service 550 can be used to programmatically retrieve a customer's monitoring data, view graphs, and set alarms to assist in troubleshooting, spotting trends, and take automated action based on the state of the cloud environment. The metrics can then be stored in account use database 252, which includes the use data. The account access engine 250 can access the use data in database 252 to determine any desired metrics associated with instances running in the network of partitions 540, including application-specific information (i.e., data associated with an application running on a virtual machine) or information regarding the landscape of instances running on the virtual network provider for the tenant (e.g., how many instances are running, what zones the instances are in, what are the names associated with databases, etc.). As indicated, the policy store 260 and the customer account information 130 can also be available to the account access engine. Although not shown, other databases are also accessible by the account access engine 250 including the rules database 256 and the predetermined questions database 254 (FIG. 2). Thus, virtually any questions regarding the tenant account can be asked by account access engine, as it has access to the necessary metrics in order to determine the exact answer.

Figure 6:
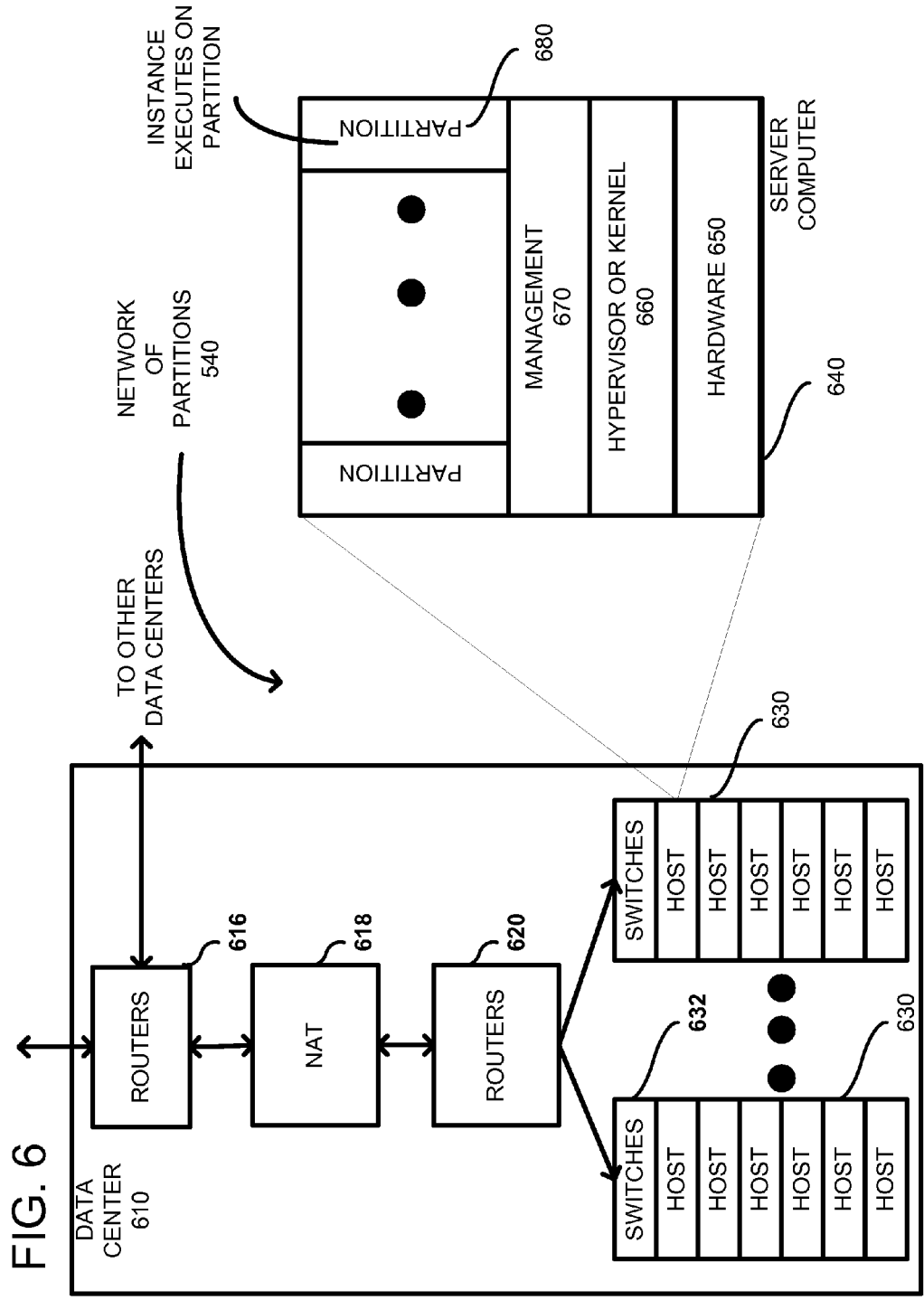
FIG. 6 shows an example of a plurality of host computers, routers and switches, which are hardware assets used for running the virtual machine instances, which the account access engine can analyze.

FIG. 6 illustrates the network of partitions 540 and the physical hardware associated therewith. The network of partitions 540 can include a plurality of data centers, such as data center 610, coupled together by routers 616. The routers 616 read address information in a received packet and determine the packet's destination. If the router decides that a different data center contains a host server computer, then the packet is forwarded to that data center. If the packet is addressed to a host in the data center 610, then it is passed to a network address translator (NAT) 618 that converts the packet's public IP address to a private IP address. The NAT also translates private addresses to public addresses that are bound outside of the datacenter 610. Additional routers 620 can be coupled to the NAT to route packets to one or more racks of host server computers 630. Each rack 630 can include a switch 632 coupled to multiple host server computers. A particular host server computer is shown in an expanded view at 640.

Each host 640 has underlying hardware 650 including one or more CPUs, memory, storage devices, etc. Running a layer above the hardware 650 is a hypervisor or kernel layer 660. The hypervisor or kernel layer can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 670 can be part of the hypervisor or separated therefrom and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 670, which can then pass the metrics to the monitoring service 550 for storage in account use database 252. Additionally, the management layer 670 can pass to the monitoring service 550 the number of instances that are running, when they were launched, the operating system being used, the applications being run, etc. All such metrics can be stored in the account use data for consumption by the account access engine 250. Thus, a variety of questions can be asked including environmental metrics (what type of instances are running) to actual data being used (how many emails in the user account).

Figure 7B:
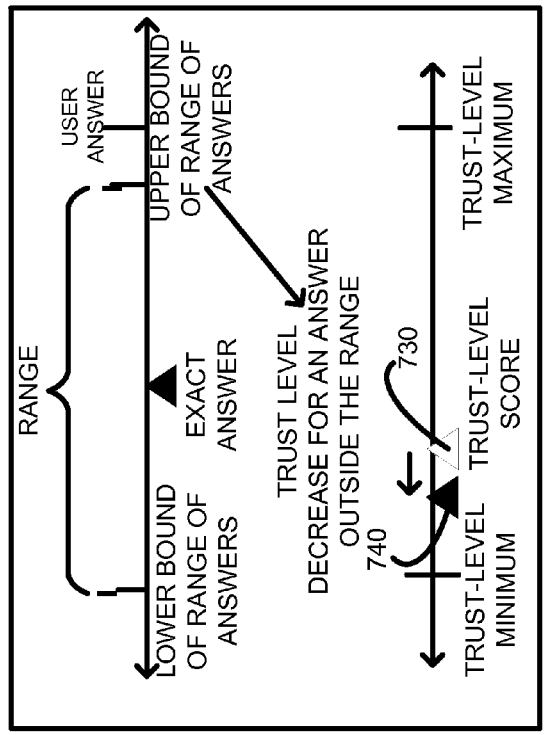
FIGS. 7A and 7B show examples of how trust-level scores can be adjusted up or down based on the accuracy of an answer.
Figure 7A:
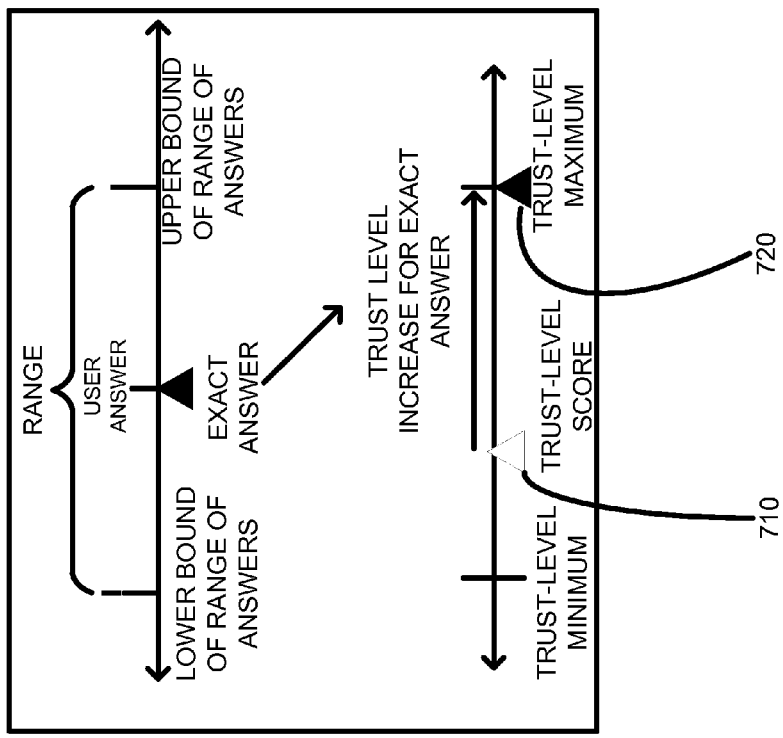

FIG. 7A shows an example of a user answering a question (i.e., indicated at "user answer") that aligns with the "exact answer" (the exact answer is based on data extracted from the virtual network provider 400.) If the user answered the question exactly and the difficulty level is sufficient, then the account access engine 110, 250 can increase the trust level score from a current position 710 to a new position 720. When the trust level reaches the maximum score, the user can be given access to the account. In some circumstances, the policy can prevent a single exact answer from being enough to provide access to the account. For example, the policy might require a minimum number of correct answers be provided.

FIG. 7B shows a user answer that is outside of the range and, specifically, above the upper bound. In such a case, the trust level can decrease as shown by the current position 730 being more than the new position 740. If the trust-level score goes below the minimum trust level, the user can be locked out of the account and require a system administrator to provide access.

Figure 8B:
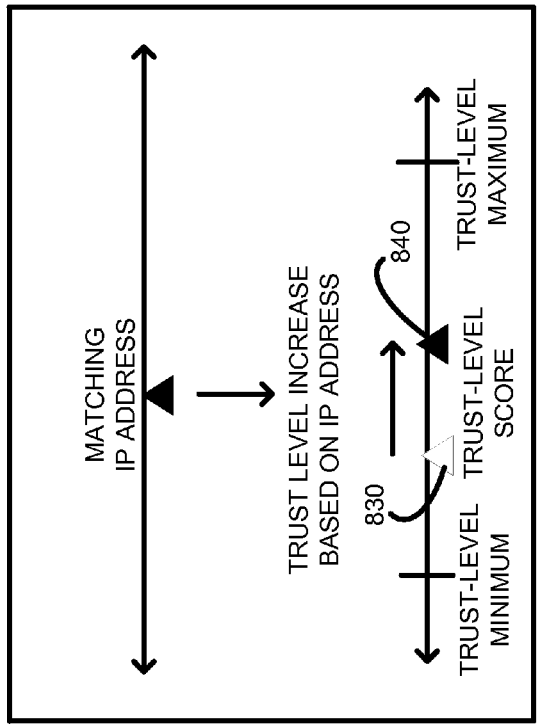
FIGS. 8A and 8B show further examples of how trust-level scores can be adjusted.
Figure 8A:
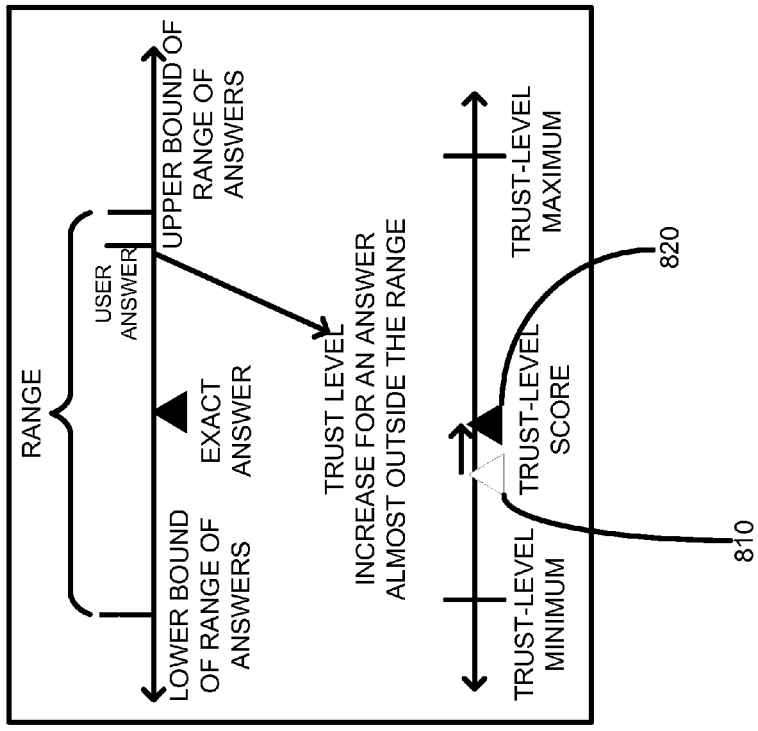

FIG. 8A shows a user answer that is near the upper bound. The trust-level score increases, but only by a small amount, from the current position 810 to a new position 820. Thus, an increase in the trust-level score is warranted, but only a small increase due to a large deviation from the actual answer. As can be seen, an amount of increase is inversely proportional to the deviation between the user answer and the exact answer.

FIG. 8B show an example of how using IP address matching can be used to assist in adjusting a trust level score. For example, the IP address can have customer account information embedded in it, and the IP address can be compared to previous IP addresses used for the same account. Or the customer account information embedded in the IP address, itself, could be sufficient to increase the trust score. As shown, matching of IP addresses can increase the trust-level score and assist in authenticating the user, as shown by the increase from current position 830 to new position 840 of the trust-level score. Other metadata can also be used to increase the trust score, such as what language is used in the user's browser, what time zone the user is located, what plugins are used by the browser, etc.

Some Particular Examples are Shown Below:

The system predetermines the change in trust level with each answer. Taking the date as an example, the question could be "At what date did you first access your account?"

presupposing that this information is in fact registered with this user's account details inside the system. Depending on how long ago this date actually is, the system could set up parameters to classify the given answer:

| Actual date is n days in the past | Trust level rises with 30% if answer is within n days from the actual date | Trust level rises with 10% if answer is within n days from the actual date | Trust level decreases with 20% if answer is more than n days from the actual date | Trust level decreases with 40% if answer is more than n days from the actual date |
|---|---|---|---|---|
| 2 | n/a | 0 (has to be exact) | 1 (one day earlier or later) | 2 (anything else) |
| 200 (half a year) | 2 | 4 | 4 | 7 |
| 2000 (five years) | 10 | 30 | 30 | 90 |

Thus, the trust level can change based on how far the user answer deviates from true answer. Additionally, a difficulty level can change based on how long ago the event occurred. And the trust level can increase in accordance with the difficulty level.

The system could be asking questions related to the data inside of an application as well. For example, for an e-mail service, the following questions could be considered:

When did you read your last e-mail?
How many e-mails are in your inbox?
Enter one or more e-mail address that you have sent e-mail to in the last week.
When did you last receive an e-mail from this specific external e-mail address?
What was the subject of the last e-mail you received from this specific person?

Figure 9:
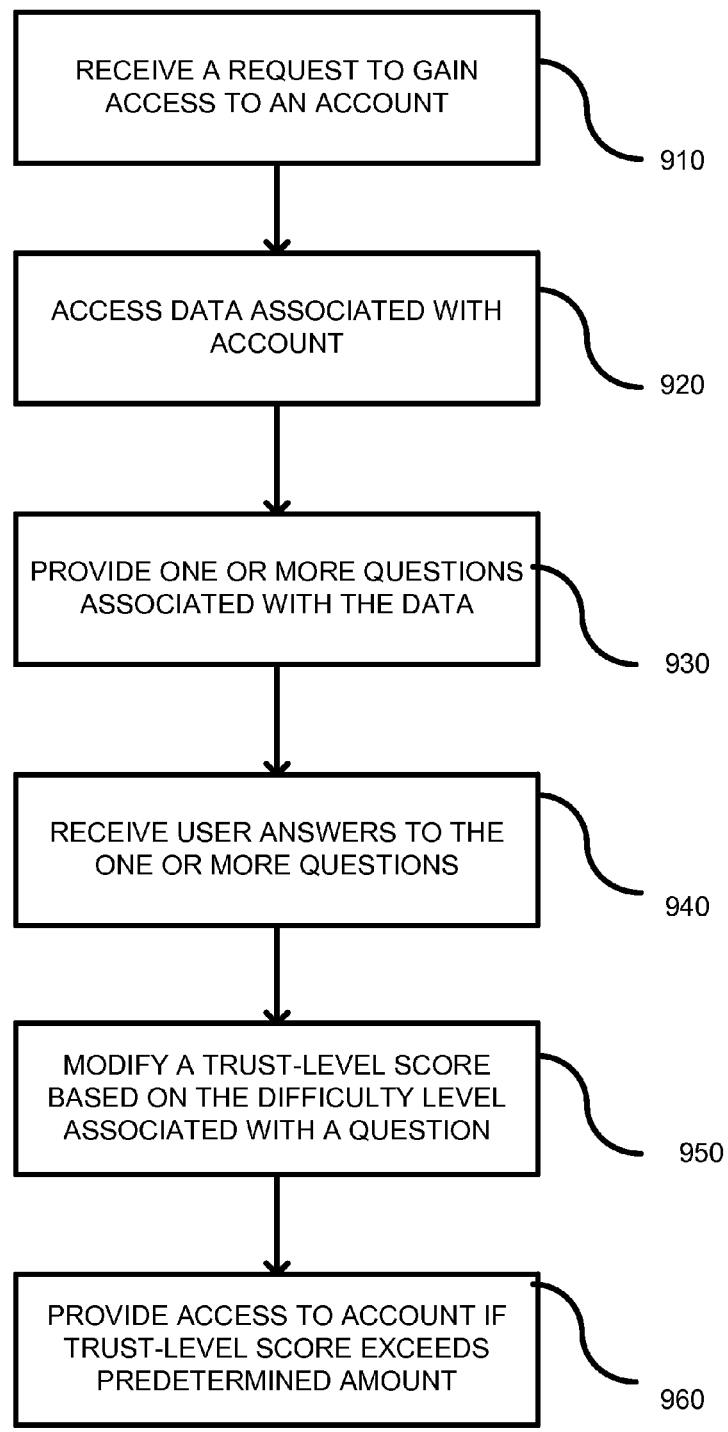
FIG. 9 is a flowchart of a method for authenticating a user to provide access to an account.

FIG. 9 is a flowchart of a method for accessing an account. In process block 910, a request is received to gain access to an account. The request can be in the form of an API request or any other form of request. In some embodiments, the request can have embedded tenant information that can be used to obtain a customer identifier associated with the user. Other parameters can also be embedded in the request based on the particular implementation.

In process block 920, data can be accessed associated with the account. As previously described the data can be any data, such as data that dynamically changes while a user is using an application or data that is stored and is independent of use of the account. In either event, parameters can be retrieved that are used as answers to authentication questions. The parameters can be a word parameter, a date parameter, a number parameter, etc.

In process block 930, one or more questions can be provided to the user that are associated with data. Each question can have an assigned difficulty level. The difficulty level can be based on the data type (word, data, number) and the difficulty level can change based on the answer. Thus, if the data is associated with a date, and the answer is a recent date, then the difficulty level can be low. However, if the date is more than 3 years ago, then the difficulty level can be high. Thus, the same user answer can receive different scores based on the difficulty level. One example of how questions can be provided to the user is that the questions can be generated for display on a user interface. Other ways of providing questions can be used, such as by use of audio signals. Generally, the questions are retrieved from a database, such as databases 140 (FIG. 1) or 254 (FIG. 2), and can be transformed into an acceptable format for the user.

In process block 940, user answers to the questions can be received. The user can reply to the questions by entering a word, number, or date in the user interface or by selecting one of a plurality of options. In any event, the account access engine can receive the answers and process the answers to determine the authenticity of the user.

In process block 950, a trust-level score can be modified based on the difficulty level associated with the question. The difficulty level can be predetermined beforehand and can change based on the exact answer retrieved. Thus, if the data is such that the answer will be difficult (e.g., a date long ago, a large number, a long name), then the difficulty level can be higher. On the contrary, if the data is such that the answer will be easy (e.g., a recent date, a small number, or a short name), then the difficulty level can be adjusted lower. As described above, the difficulty level can be determined based on a table wherein the exact answer can be used as an index into the table in order to obtain the difficulty level, which can have an associated trust-level score.

In process block 960, access to the account can be provided if the trust-level score exceeds a predetermined amount. Access to the account generally includes allowing the user to reset a password associated with the account. For example, the user can be presented with a user interface asking the user to enter a new password. Alternatively, the user can be provided with link, which when selected, provides the steps necessary for the user to gain access to the account.

Figure 10:
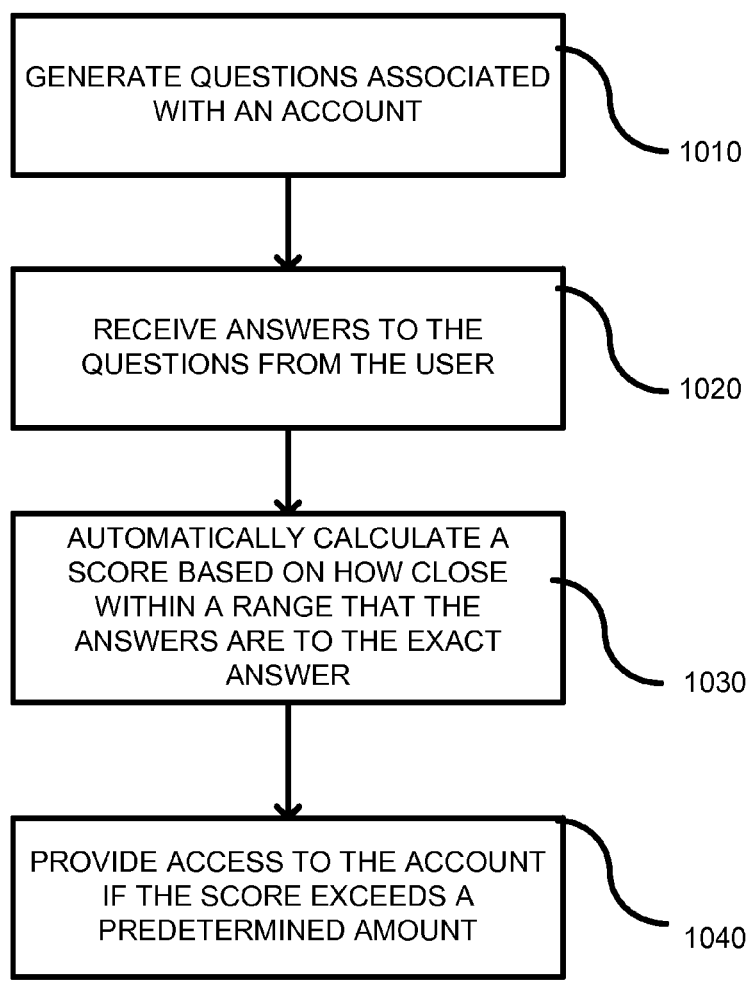
FIG. 10 is a flowchart of a method according to another embodiment for providing access to an account.

FIG. 10 is a flowchart according to another embodiment for accessing a user account. In process block 1010, questions can be generated associated with the account. Question generation can include random selection from a list of predetermined questions. Alternatively, the questions can be generated by retrieving the list of questions from a database and sequentially asking the questions.

In process block 1020, answers are received by the account access engine. The answers can be a word, number, or date. The account access engine can receive the answers and process the answers to determine the authenticity of the user.

In process block 1030, a score can be automatically calculated based on how close within a range that the answers are to the exact answer. For example, a larger percentage deviation the user answer is from the exact answer, results in a lower trust-level score. The automatic calculation can include using an algorithm wherein an amount of increase is inversely proportional to the deviation between the user answer and the exact answer.

In process block 1040, access to the account can be provided if the score exceeds a predetermined amount. Access to the account generally includes allowing the user to reset a password associated with the account. For example, the user can be presented with a user interface asking the user to enter a new password. Alternatively, the user can be provided with link, which when selected, provides the steps necessary for the user to gain access to the account.

Figure 11:
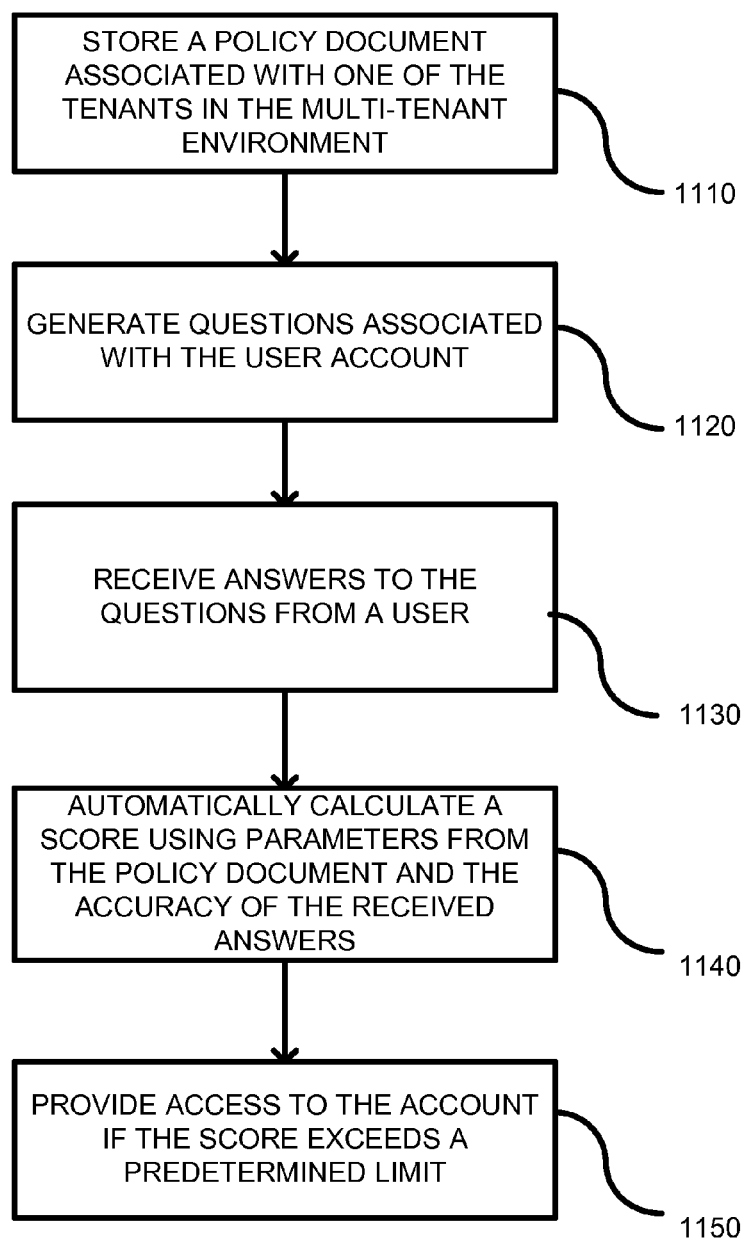
FIG. 11 is a flowchart of a method according to yet another embodiment for providing access to an account.

FIG. 11 is a flowchart of a method according to another embodiment. In process block 1110, a policy document can be stored associated with a tenant in a multi-tenant environment. For example, a tenant administrator can use a management portal to update a policy store including a policy document controlled by the tenant.

In process block 1120, questions can be generated associated with the user account. The generated questions can be retrieved from a database, for example. Other techniques can be used for generating questions. In some embodiments, the answers to the questions can be analyzed to determine a difficulty of the question. If the difficulty level is too low, the question can be bypassed and a next question from the list can be used.

In process block 1130, answers can be received from a user. As already described above, the answers can be entered via a user interface and transmitted to the account access engine.

In process block 1140, a score can be automatically calculated using parameters from the policy document and the accuracy of the received answers. To determine the accuracy of the received answers, an exact answer can be extracted from the virtual network provider 400 using a variety of available databases, such as from an account use database (see FIG. 5, at 252) or a customer account (see FIG. 5, at 130). A deviation between the exact answer and the user answer can be calculated. Parameters from the policy document can include a multiplier if the policy is to accelerate the determination. Other parameters can be used. In some embodiments, a range can be dynamically calculated based on the difficulty level. More difficult questions can be provided a wider range of acceptable answers.

In process block 1150, access can be provided to the account if the score exceeds a predetermined limit. Conversely, if the score does not reach the limit or falls below a lower limit, the user can be locked out of the account.

Figure 12:
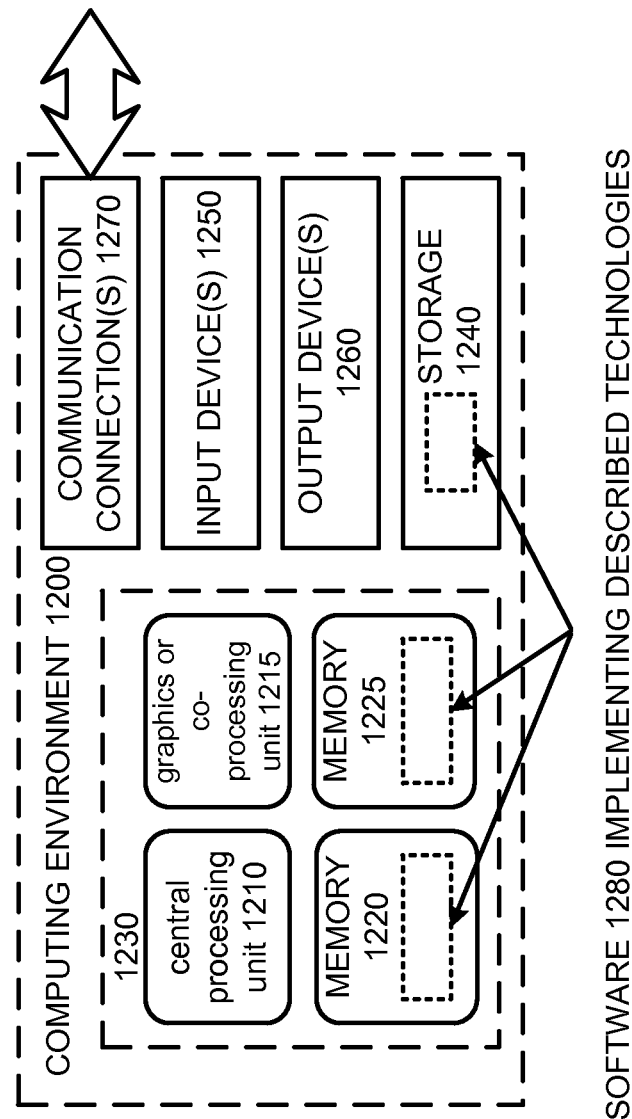
FIG. 12 depicts a generalized example of a suitable computing environment in which the described innovations may be implemented.

FIG. 12 depicts a generalized example of a suitable computing environment 1200 in which the described innovations may be implemented. The computing environment 1200 is not intended to suggest any limitation as to scope of use or functionality, as the innovations may be implemented in diverse general-purpose or special-purpose computing systems. For example, the computing environment 1200 can be any of a variety of computing devices (e.g., desktop computer, laptop computer, server computer, tablet computer, etc.)

With reference to FIG. 12, the computing environment 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing environment 1200 includes storage 1240, one or more input devices 1250, one or more output devices 1260, and one or more communication connections 1270. An interconnection mechanism (not shown) such as a bus, controller, or network interconnects the components of the computing environment 1200. Typically, operating system software (not shown) provides an operating environment for other software executing in the computing environment 1200, and coordinates activities of the components of the computing environment 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing environment 1200. The storage 1240 stores instructions for the software 1280 implementing one or more innovations described herein. For example, the account access engine can be the software 1280 executed from the memory 1220.

The input device(s) 1250 may be a touch input device such as a keyboard, mouse, pen, or trackball, a voice input device, a scanning device, or another device that provides input to the computing environment 1200. The output device(s) 1260 may be a display, printer, speaker, CD-writer, or another device that provides output from the computing environment 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of providing access to an account, comprising:
   receiving a request to gain access to the account;
   accessing data associated with the account;
   providing one or more questions associated with the data to a user, wherein at least one question has a difficulty level;
   receiving user answers to the one or more questions;
   for each user answer, modifying an overall trust-level score based on the difficulty level associated with the question and an accuracy of the user answer;
   wherein each user answer has a range of acceptable answers with upper and lower bounds and the overall trust-level score changes based on how much the user answer deviates from an exact answer, wherein an amount of increase of the overall trust-level score is inversely proportional to the deviation between the user answer and the exact answer; and
   if the trust-level score exceeds a predetermined amount, providing access to the account.

2. The method of claim 1, wherein receiving the request to gain access includes receiving a request to reset a password associated with the account.

3. The method of claim 1, wherein accessing data associated with the account includes retrieving parameters that change based on use of the account or retrieving parameters based on stored account information, which is independent of use of the account.

4. The method of claim 3, wherein the parameters include at least one date parameter.

5. The method of claim 1, wherein each user answer has a range of acceptable answers with upper and lower bounds, and an exact answer associated with the accessed data, the exact answer being between the upper and lower bounds.

6. The method of claim 1, wherein providing access to the account includes allowing the user to reset a password associated with the account.

7. The method of claim 1, wherein if the trust level does not exceed the predetermined amount, then providing another question to be answered.

8. A computer-readable device including instructions thereon for executing a method of gaining access to an account, comprising:
   generating, for display, questions associated with the account;
   receiving answers to the questions from a user, wherein the answers can be an exact answer and within a range from the exact answer;
   automatically calculating a score based on how close within the range that the answers are to the exact answer, wherein an incorrect answer contributes to the score based on an amount that the answer deviates from the exact answer while being within the range such that the contribution to the score is inversely proportional to the deviation; and
   providing access to the account if the score exceeds a predetermined limit.

9. The computer-readable device of claim 8, further including extracting exact answers to the questions by accessing use data from the account.

10. The computer-readable device of claim 8, wherein generating the questions includes retrieving the questions from a database and transmitting the retrieved questions to a user display.

11. The computer-readable device of claim 8, wherein the account is a multi-user account and further including reading a policy document to obtain the predetermined limit.

12. The computer-readable device of claim 11, wherein parameters associated with the calculating are obtained from the policy document.

13. The computer-readable device of claim 8, wherein if the score does not exceed the predetermined score within a predetermined number of questions, then locking the account from use by the user.

14. The computer-readable device of claim 8, further including receiving a request to access the user account, and using an IP address associated with the request to adjust the score.

15. The computer-readable device of claim 14, further including comparing the IP address to previously stored IP addresses that were used to access the account.

16. The computer-readable device of claim 8, further including storing a difficulty rating in association with each question, and wherein calculating the score uses the difficulty rating as an input parameter.

17. A computer-readable device including instructions thereon for executing a method of gaining access to a user account in a multi-tenant environment, comprising:
- storing a policy document associated with one of the tenants in the multi-tenant environment, the policy document including parameters used in allowing access to multiple user accounts associated with a tenant in the multi-tenant environment;
- generating questions associated with the user account;
- receiving answers to the questions from a user, wherein the answers can be an within a range from an exact answer;
- automatically calculating a score using parameters from the policy document and the accuracy of the received answers including an amount of deviation within the range from the exact answer, such that the score increase inversely proportionally to the amount of deviation; and
- providing access to the account if the score exceeds a predetermined limit.

18. The computer-readable device of claim 17, further including determining the exact answer by accessing use data associated with the user account.

19. The computer-readable device of claim 17, further including dynamically calculating the range from the exact answer by accessing the use data and determining a difficulty level based on the use data, wherein higher levels of difficulty are provided a wider range of acceptable answers.

20. The computer-readable device of claim 19, wherein generating questions includes analyzing the difficulty level of a question and bypassing the question if the difficulty is below a predetermined threshold.

21. A system for allowing access to a user account, comprising:
- a plurality of host server computers that support virtual machine instances executing in a multi-tenant environment; and
- an account access engine that provides a sequence of questions to a user of the user account, the account access engine receiving a plurality of answers in response to the questions and calculating a score based on how close the answers are to being accurate, wherein larger deviations from accurate answers receive a lower increase in the score.

* * * * *